US009655300B2

(12) United States Patent
Schany et al.

(10) Patent No.: US 9,655,300 B2
(45) Date of Patent: May 23, 2017

(54) SYSTEMS AND METHODS FOR COLLECTING BIOMASS

(75) Inventors: William J. Schany, Emmetsburg, IA (US); Scott A. Weishaar, Sioux Falls, SD (US)

(73) Assignee: POET Research, Inc., Sioux Falls, SD (US)

( * ) Notice: Subject to any disclaimer, the term of this patent is extended or adjusted under 35 U.S.C. 154(b) by 166 days.

(21) Appl. No.: 13/993,053

(22) PCT Filed: Dec. 8, 2011

(86) PCT No.: PCT/US2011/063959
§ 371 (c)(1),
(2), (4) Date: Sep. 5, 2013

(87) PCT Pub. No.: WO2012/078882
PCT Pub. Date: Jun. 14, 2012

(65) Prior Publication Data
US 2013/0337524 A1    Dec. 19, 2013

Related U.S. Application Data

(60) Provisional application No. 61/421,457, filed on Dec. 9, 2010.

(51) Int. Cl.
*A01D 43/08* (2006.01)
*A01D 43/06* (2006.01)
*A01D 43/00* (2006.01)
*A01D 91/04* (2006.01)
(Continued)

(52) U.S. Cl.
CPC .............. *A01D 43/06* (2013.01); *A01D 41/14* (2013.01); *A01D 43/006* (2013.01); *A01D 43/086* (2013.01); *A01D 45/021* (2013.01); *A01D 91/04* (2013.01)

(58) Field of Classification Search
CPC ...... A01D 43/086; A01D 43/06; A01D 91/04; A01D 43/006; A01D 435/165
See application file for complete search history.

(56) References Cited

U.S. PATENT DOCUMENTS 6,729,951 B2    5/2004 Hoskinson et al.
2009/0019826 A1    1/2009 Rigney
(Continued)

OTHER PUBLICATIONS

Celignis, Analysis of Corn Stover, Accessed Mar. 21, 2015, Online at: www.celignis.com/feedstock.php?value=27.*
(Continued)

*Primary Examiner* — Karen Cochrane Carlson
*Assistant Examiner* — Jennifer M. H. Tichy
(74) *Attorney, Agent, or Firm* — Amin, Turocy & Watson, LLP

(57) ABSTRACT

A system for collecting biomass for the production of ethanol is disclosed. Also disclosed is a method for collecting biomass. The method comprising: harvesting biomass with a combine, wherein a first portion of the biomass is substantially forced against the ground and a second portion of the biomass passes through the combine and forming bales comprising the second portion of the biomass. According to an aspect, the bales comprise a majority of the second portion of the biomass and a small part of the first portion of the biomass.

19 Claims, 13 Drawing Sheets

(51) Int. Cl.
*A01D 41/14* (2006.01)
*A01D 45/02* (2006.01)

(56) References Cited

U.S. PATENT DOCUMENTS

2010/0205922 A1  8/2010  Pierson
2010/0233771 A1  9/2010  McDonald et al.

OTHER PUBLICATIONS

Shinners et al., Single-Pass Harvest of Corn Grain and Stover: Performance of Three Harvester Configuration, Transactions of the ASABE, (Jan.-Feb. 2009), vol. 52(1): pp. 51-60.*
Sokhansanj et al., Engineering aspects of collecting corn stover for bioenergy, Biomass and Bioenergy, 23 (2002) pp. 347-355.*
Devon h, baling cornstalks, Uploaded Oct. 13, 2007, Available online at: www.youtube.com/ watch?v=_Fjtxb2tr0U.*
Scotthinch, bailing cornstalks 2012, Published Nov. 5, 2012, Available online at: www.youtube. com/watch?v=QKEUzEIAdVI.*
Anorma9, Amish Baling Corn Stalks with a Team of Mules, Uploaded Nov. 12, 2008, Available online at: www.youtube.com/watch?v=VdHBNf710zQ.*
Lange, et al., "Commercial scale cob collection, new revenue for corn farmers, the reality of cellulosic ethanol . . . is here." Vital, POET Research, Inc., Summer 2010, distributed on Jul. 12, 2010, 7 pages.
Shinners, et al., "Single- and Two-Pass Corn Stover Harvesting Systems". An ASABE Meeting presentation, paper No. 095652. Written for presentation at the 2009 ASABE Annual International Meeting, Reno, Nevada, Jun. 21-Jun. 24, 2009, 25 pages.
Shinners, et al., Aerobic and Anaerobic Storage of Single-pass, Chopped Corn Stover. An ASABE Meeting presentation, paper No. 095654. Written for presentation at the 2009 ASABE Annual International Meeting, Reno, Nevada, Jun. 21-Jun. 24, 2009, 29 pages.
International Search Report dated Apr. 3, 2012 for International Application No. PCT/US11/63959, 11 pages.
Office Action for Mexican Patent Application No. MX/a/2013/006561 dated Nov. 3, 2015, 4 pages.
Office Action for Mexican Patent Application No. MX/a/2013/006561 dated Jun. 2, 2016, 4 pages.

* cited by examiner

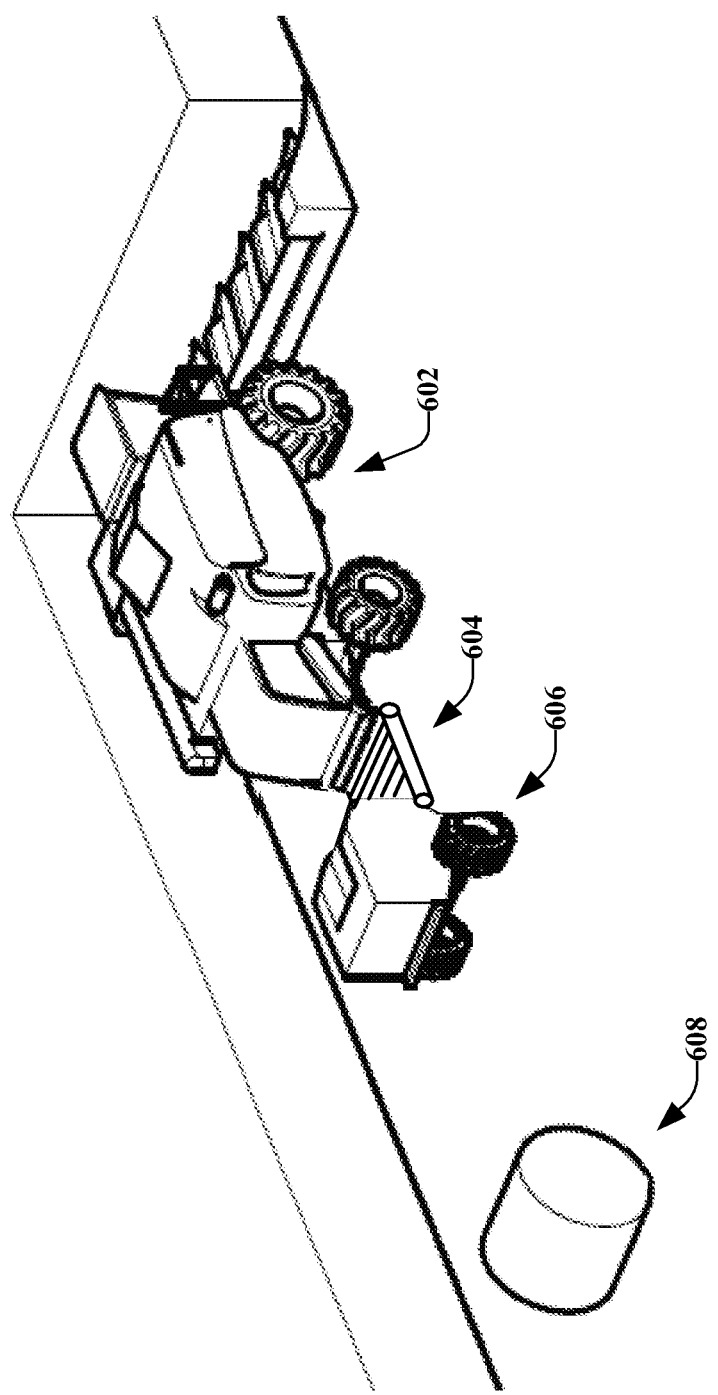

OPERATING CONDITION

Collection rate (percent of available biomass)

OPERATING CONDITION

Bale composition, cob (percent by weight)

FIG. 11A

Biomass Composition

| Cob (percent) | Husks/ Leaves (percent) | Stalk (percent) | Cellulose (Glucan) (percent) | Hemicellulose | | | | Lignin (percent) | Ash (percent) |
|---|---|---|---|---|---|---|---|---|---|
| | | | | Xylan (percent) | Arabinan (percent) | Acetate (percent) | Composite (percent) | | |
| 100 | 0 | 0 | 36.0 | 33.3 | 3.6 | 3.0 | 39.9 | 14.9 | 2.2 |
| 0 | 100 | 0 | 37.2 | 25.6 | 4.9 | 2.2 | 32.7 | 13.0 | 7.7 |
| 0 | 0 | 100 | 41.7 | 22.5 | 2.4 | 2.6 | 27.5 | 18.3 | 3.7 |
| 50 | 0 | 50 | 38.8 | 27.9 | 3.0 | 2.8 | 33.7 | 16.6 | 3.0 |
| 50 | 50 | 0 | 36.6 | 29.5 | 4.2 | 2.6 | 36.3 | 14.0 | 5.0 |
| 30 | 50 | 20 | 37.7 | 27.3 | 4.0 | 2.5 | 33.8 | 14.6 | 5.3 |

FIG. 11B

Biomass
Typical and Expected Composition

| | Cellulose (Glucan) (percent) (approx.) | Hemicellulose (percent) (approx.) | Lignin (percent) (approx.) | Ash (percent) (approx.) |
|---|---|---|---|---|
| Typical Range | 35-45 | 24-42 | 12-20 | 2-6 |
| Expected Range | 30-55 | 20-50 | 10-25 | 1-10 |

FIG. 12A

|  | Cob (percent) | Husk/Leaf (percent) | Stalk (percent) | Grain (percent) | Other (percent) |
|---|---|---|---|---|---|
| Sample 1, Traditional Stover Bale | 9 | 48 | 32 | 6 | 5 |
| Sample 2, Second Pass Bale | 30 | 55 | 13 | 2 | 1 |
| Sample 3, Second Pass Bale | 33 | 48 | 17 | 0 | 1 |
| Sample 4, Second Pass Bale | 29 | 44 | 23 | 1 | 4 |
| Sample 5, Second Pass Bale | 45 | 39 | 12 | 1 | 4 |
| Average of Second Pass Bales | 34 | 46 | 16 | 1 | 2 |

FIG. 12B

|  | Cob (percent) | Husk/Leaf (percent) | Stalk (percent) | Grain (percent) | Other (percent) |
|---|---|---|---|---|---|
| Traditional Stover Bale | 9 | 48 | 32 | 6 | 5 |
| Average of First Pass Bale | 61 | 26 | 6 | 2 | 5 |
| Minimum of First Pass Bale | 45 | 12 | 2 | 0 | 1 |
| Maximum of First Pass Bale | 72 | 42 | 12 | 7 | 8 |

SYSTEMS AND METHODS FOR COLLECTING BIOMASS

CROSS-REFERENCE TO RELATED APPLICATIONS

This application is a U.S. national stage filing of Patent Cooperation Treaty (PCT) application serial number PCT/US11/63959 entitled "SYSTEM AND METHODS FOR COLLECTING BIOMASS" filed on Dec. 8, 2011, which claims the benefit of U.S. Provisional Application Ser. No. 61/421,457 and entitled "SYSTEMS AND METHODS FOR COLLECTING BIOMASS" filed Dec. 9, 2010. The entireties of the aforementioned applications are herein incorporated by reference.

FIELD

The subject disclosure relates to systems and methods for collecting biomass.

BACKGROUND

Biomass comprises plant matter that may be suitable for direct use in a number of industrial and manufacturing processes. Often, biomass may be utilized as a fuel source, such as burning of peat and plant material for warmth and electricity generation. Additionally, biomass may often be collected for use as animal feed, animal bedding, and the like. Biomass may be collected for composting, derivation of fertilizers, and other sustainable agricultural practices. Biomass also has applications in manufacturing, including the manufacturing of next generation biodegradable plastics. Furthermore, biomass may be utilized as a raw material for the generation of ethanol, and other chemically or biologically derived products.

One commonly utilized source of biomass is corn plants after the collection of the kernels for traditional food, fuel, and animal feed purposes. Corn, as a biomass, is particularly plentiful in the United States and other countries where corn is a major crop. Corn biomass typically includes the stalk of the plant, leaves and husks, and the cob material. The kernels are typically removed from the cobs by combine or other mechanical means.

Biomass is often collected in bulk by necessity of scale and economics. Bulk collection of biomass has some intrinsic disadvantages, the largest of which is the collection of foreign materials along with the desired biomass. For example, when collecting crop byproducts, such as corn cobs and stover (e.g., stalks and leaves) the biomass is collected in a field where dirt, rocks, and similar material may be collected in conjunction with the biomass.

When biomass is utilized as animal feed, such contaminants may lead to digestive problems in the animals, reduction of the nutritional value of the biomass, and may lead to rejection of the feed by animals. When biomass is utilized for product manufacturing, the foreign materials may contaminate final products, clog or damage manufacturing machinery, or otherwise interfere with the manufacturing process. When used as fuel in a power plant, this foreign material may accumulate in the burner and necessitate more frequent cleaning. In the context of ethanol production at a biorefinery using biomass, foreign materials in the biomass may inhibit ethanol production, clog machinery, and even damage the biorefinery. In response to this, incoming biomass is often cleaned prior to use in biorefinery and manufacturing sites. Cleaning consumes valuable time, incurs additional capital and operational costs, and generates additional waste water.

SUMMARY

The disclosed aspects relate to a method for collecting biomass. The method comprises harvesting biomass with a combine, wherein a first portion of the biomass is substantially forced against the ground and a second portion of the biomass passes through the combine. The method also comprises forming bales comprising the second portion of the biomass. The bales can be formed with a majority of the second portion of the biomass and with a small part of the first portion of the biomass, according to an embodiment.

DESCRIPTION OF THE DRAWINGS

In order that the various aspects may be more clearly ascertained, some embodiments will now be described, by way of example, with reference to the accompanying drawings, in which:

FIG. 6 is an isometric illustration of a system for first pass biomass collection, in accordance with some embodiments;

FIGS. 11A and 11B list the composition of biomass comprising lignocellulosic plant material from the corn plant according to exemplary and representative embodiments; and FIGS. 12A and 12B provide data and results obtained through the use of the biomass collection system according to some exemplary embodiments.

DESCRIPTION OF THE EMBODIMENTS

The one or more disclosed aspects relate to systems and methods for the collection of biomass. Given these significant drawbacks in current biomass collection, the disclosed aspects provide for collection of biomass whereby the inclusion of foreign materials is reduced. The disclosed aspects also provide for the collection of corn cobs and stover.

Biomass may be utilized in a number of downstream applications including as a fuel source, livestock feed, compost/fertilizer, groundcover, next generation plastics manufacturing, raw materials (such as fiber) manufacturing, and cellulosic ethanol production, among other known or future known applications. As a way of example, much of the disclosure will center on the application of biomass for use as a raw material for cellulosic ethanol production. This detailed disclosure of biomass for use in ethanol production is intended to merely illustrate an example application for the use of biomass. These examples are not intended in any way to limit the scope of the embodiments to collection of biomass for any particular downstream purpose.

Biomass comprises plant matter that can be suitable for direct use as a fuel/energy source or as a feedstock for processing into another bioproduct (e.g., a biofuel such as cellulosic ethanol) produced at a biorefinery (such as an ethanol plant). Biomass may comprise, for example, corn cobs and stover (e.g., stalks and leaves) made available during or after harvesting of the corn kernels, fiber from the corn kernel, switchgrass, farm or agricultural residue, wood chips or other wood waste, algae, and other plant or microorganism matter. In order to be used or processed, biomass will be harvested and collected from the field and transported to the location where it is to be used or processed.

Figure 1:
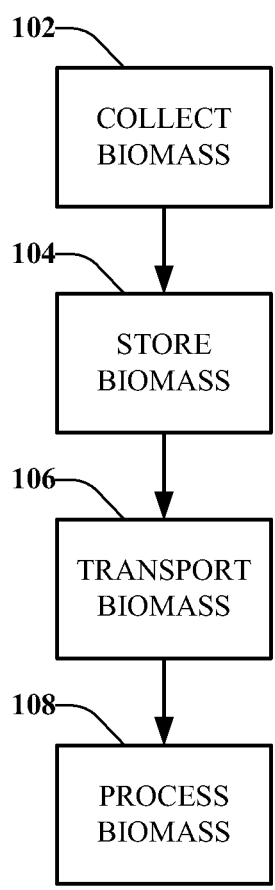
FIG. 1 is a schematic diagram of a process flow for systems for the usage of biomass, in accordance with some embodiments.

As previously noted, for many uses of biomass it is desired that only material other than grain (MOG) which is free of foreign materials, such as dirt and rocks, is collected. FIG. 1 illustrates means of collection of biomass. The procurement of biomass typically involves collection of the biomass 102 from one or more sources. In many of the embodiments provided herein, biomass is collected from a corn field during or after harvest of the corn kernels. In alternate embodiments, the biomass may be collected during or after the harvest of other grains or food crops. When the biomass is wood materials, collection may be performed at the mill or other processing center. The collected biomass will typically be baled, or maintained as loose material. Details of the biomass collection process in accordance with exemplary embodiments are discussed below in greater detail with reference to FIGS. 2-6. Methods of collecting biomass typically need to be readily understood and accepted by the farming industry in order to ensure collection compliance. Likewise, collection methods which slow the corn grain harvest are unlikely to be adopted by the farming community. Thus, the described systems and methods for collecting biomass with reduced levels of foreign materials are generally rapid and do not deviate significantly from accepted farming practices.

After biomass collection, the material is then stored 104 until needed for downstream processing, such as input material at a cellulosic ethanol plant, manufacturing plant, or entry into an animal feed stream. When biomass has been baled, storage can include stacking bales to reduce contact between the biomass and the ground. It may also be advantageous to cover the biomass, thereby protecting it from exposure to the elements. In some embodiments, storage may be performed to enable the biomass to dry out. This may include periodically disrupting the biomass such that buried moist biomass is brought into contact with the air. Storage may likewise include some kind of pretreatment, in some embodiments, prior to processing. For example, it may be desirable to adjust the pH of the stored biomass to begin cellulose decomposition or some other desired effect. In some embodiments, it may be desirable for biomass to be stored for greater than 12 months until a next harvest season, without great loss in biomass quality.

After storage, the biomass is transported 106 to the processing facility. In the case of ethanol production, the biomass is transported to the biorefinery. For product manufacturing, the biomass may be transported to a factory. For composting, biomass may be transported to a landfill. For energy, biomass may be transported to a power plant. Further, when used as animal feed or bedding, the biomass may be transported to a farm or processing center. Typically, transport is performed using rail, or truck and trailers. The biomass may then be processed 108. In many embodiments disclosed herein, the processing may include use of the biomass as starting material for ethanol production. Other uses are considered for the biomass, however, and are included to be within the scope of some embodiments. These other uses may include biomass as a fuel, for compost/fertilizer, as ground cover, animal feed, or as raw material for some other article of manufacture.

Figure 2:
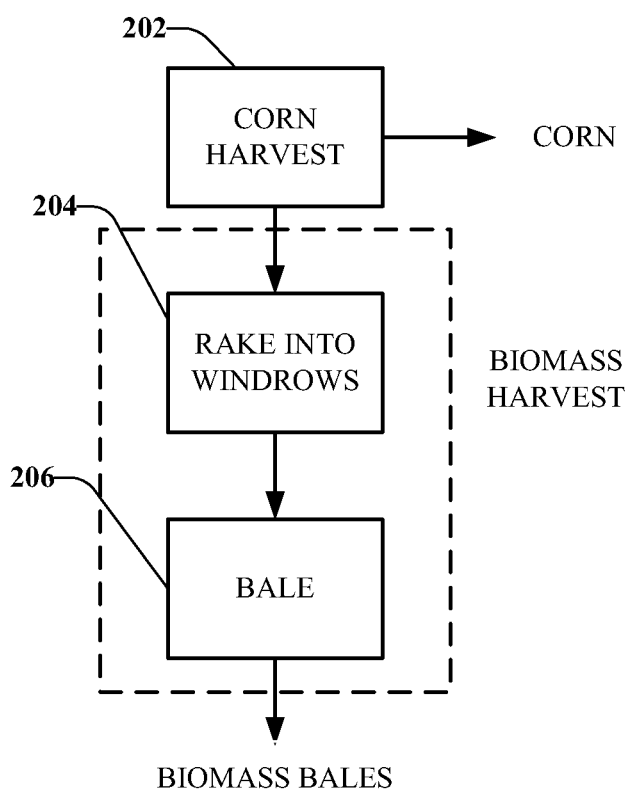
FIG. 2 is a schematic diagram of a process flow for systems for the collection of biomass, in accordance with some embodiments.

FIGS. 2-6 provide more detailed explanations of example methods and mechanisms for the collection of the biomass. In some embodiments, biomass may be collected from a corn field during or after the harvesting of corn. In one example, FIG. 2 illustrates traditional practices for the harvesting of biomass. Note that, while in the present example corn is being utilized for harvest as a biomass, as indicated above, additional biomass sources may be readily adapted for use in conjunction with the disclosed systems. For example, hay or other food stock plant products may likewise be readily harvested in a similar fashion for biomass sources, in some alternate embodiments.

In this example of traditional biomass harvesting, a combine configured to harvest corn 202 is operated during harvest. The combine head pulls the corn ears (including husk and leaves) off the stalk, occasionally also removing and capturing a portion of the corn stalk (e.g. an upper portion), and removes the corn kernels from the ears. The remaining residue, or stover (e.g., stalks, leaves, husks and cobs), can be chopped into smaller pieces by a chopper assembly and spread on the field using a spreader apparatus at the back of the combine. In a typical "rake and bale" operation, corn stover (e.g., stalks, leaves, husks and cobs) is raked 204 into rows (e.g. windrows) after the harvesting of corn and the rows are baled 206 into round or square bales using a baler. This results in a high capture rate of corn stover (typically 60 percent or more), but the bales may also comprise a high percentage of foreign material, such as dirt, stones, and debris. When biomass is prepared and pre-treated according to an embodiment of the ethanol production process, foreign material may cause problems with, for example, equipment, such as mills and pumps (among other things), and waste treatment systems. Removing the entire corn plant from the field for use as biomass can also leave the soil bare and may cause erosion of the ground and may deplete the soil of nutrients. The lower portions of corn stalks may also be more difficult to pre-treat and process into ethanol, and may require more severe conditions for break down into sugars.

Figure 3:
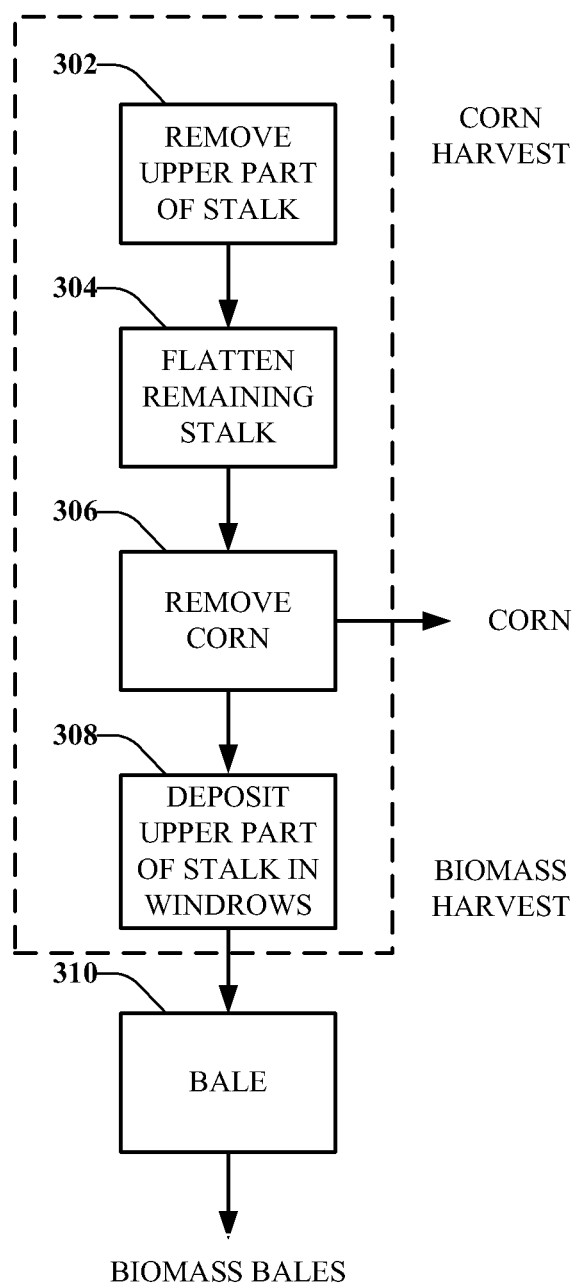
FIG. 3 is a schematic diagram of a process flow for biomass collection, in accordance with some embodiments.

In response to these drawbacks of typical biomass harvesting, embodiments of a harvesting method which leaves a portion of the stalk is provided. According to a first embodiment, as shown in FIG. 3, the upper part of stalk is removed 302 and the combine is used to force the lower portion (e.g., remaining portion) of the stalks mostly flat (e.g. horizontal) on the field 304 creating a "bed" onto which the residue (upper portion of the stalk and cobs) can be deposited after removal of the corn from the cob 306. Forcing the stalks flat on the field may be achieved by using a "chopping corn head" that cuts the lower portion of the stalk close to the ground and lays it on the field, or a "stalk stomper" that bends the stalks down and forces them horizontally on the field (e.g., stomping), or a combination of both chopping and stomping. The spreader apparatus of the combine may be deactivated such that the upper portion of the stalks and the cobs are deposited in windrows 308 behind the combine as the combine moves along the field. The chopper function of the combine may also be turned off in order to leave the residue in larger pieces for baling. The upper portions of stalks and the cobs may then be picked up and baled 310 by a baler, producing biomass bales with minimal amounts of foreign material or lower portions of stalks. These embodiments of biomass harvesting results in a lower collection of total biomass available; however, with this reduction in overall yield there is an accompanying large reduction in foreign material and undesirable lower stalk, included in the bales. Additionally, as much of the less desirable "lower" portion of the corn stalk remains on the field, the risk of unwanted erosion, or nutrient depletion of the soil, can be greatly mitigated.

The function of baling the upper portion of the corn plant can be performed by a single pass of a combine (e.g., the first pass) and a single pass of a baler (e.g., the second pass), providing for a fast method of collecting biomass with desirable qualities for ethanol (or other manufacturing) production.

Figure 4:
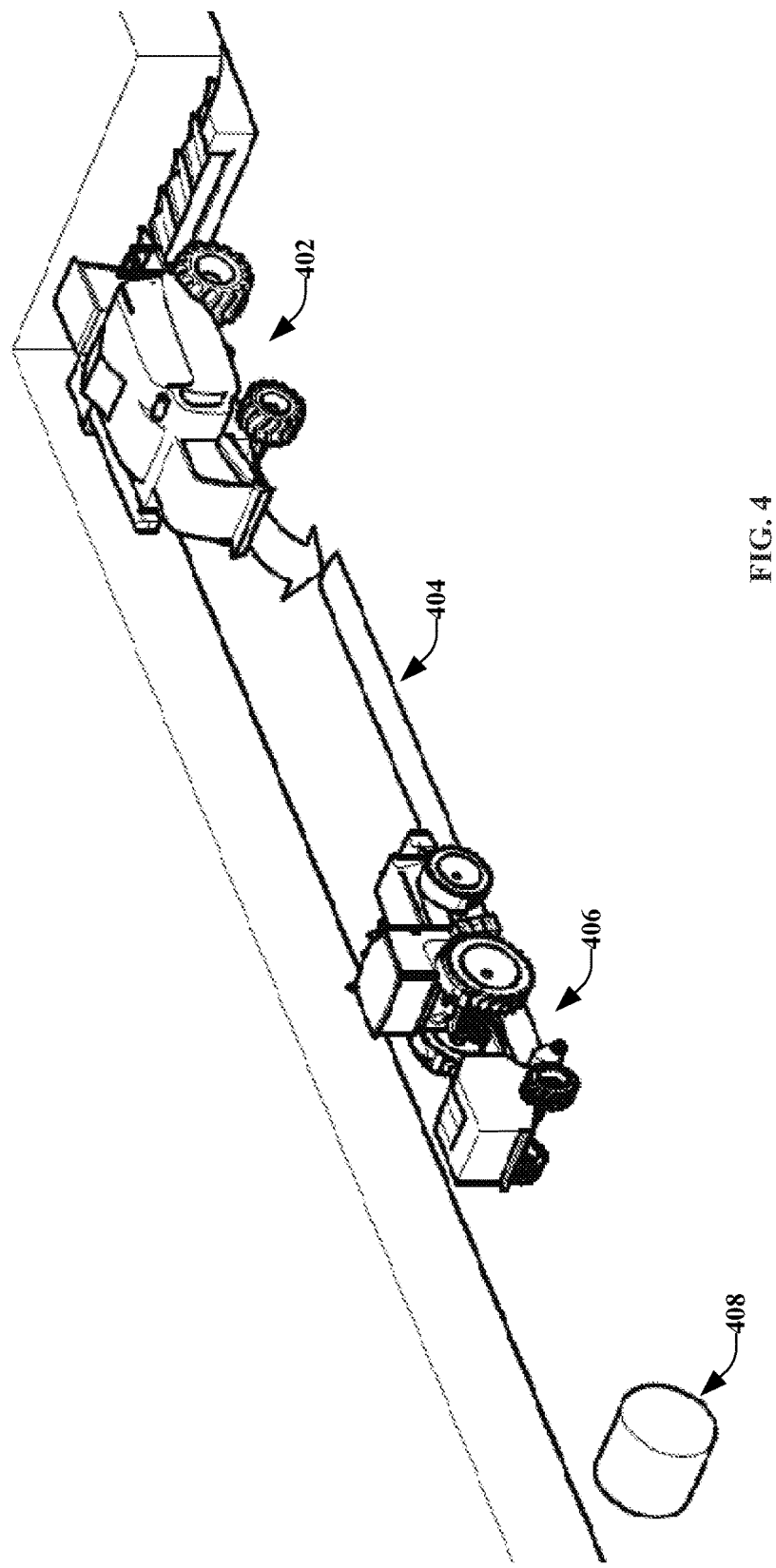
FIG. 4 is an isometric illustration of a system for second pass biomass collection, in accordance with some embodiments.

FIG. 4 provides an example illustration of the collection of biomass as described above in reference to FIG. 3. In this example, the combine 402 is seen removing the corn and depositing some portion of the stalk, leaves, and cobs in windrows 404 behind the combine 402. The lower portions of the corn stalks are flattened (or cut) to provide a bed upon which the windrows 404 are deposited. The chopping apparatus and spreader apparatus of the combine may be disabled in these embodiments to ensure that biomass is deposited in clean windrows atop the bed of stalks. A baler 406 may then collect the windrow material 404 and generate biomass bales 408 which are substantially debris free.

In some alternate embodiments, as shown at FIG. 5, the combine again removes the upper portion of the stalk 502. The corn may be removed 504 from the cob, which can be as typically performed. However, instead of depositing this removed material on the ground, in these embodiments, the cobs and stover from the upper portion of the stalk are deposited directly from the combine into a collection cart or baler 506. By directly placing the biomass within a collection cart or baler, these embodiments can help keep the biomass from coming into contact with the ground. Thus, the collection of foreign material (dirt, rocks, etc.) can be kept to an absolute minimum. Conveyance of the biomass from the combine to the collection bin or baler may be performed using an auger or conveyer belt type apparatus. The biomass may then be baled 508. Baling may occur directly at harvest if the biomass is directed to a baler, or may be performed from collected biomass if it has been directed to a collection bin. In some embodiments, biomass may remain as loose material rather than being baled.

As with the previous example, this first pass baling technique leaves a significant portion of the lower plant stalk on the field for nutrient support and erosion control. Only upper portions of the stalk, leaves, husks and cobs are deposited into the collection cart (and/or baler), according to an aspect.

FIG. 6 provides one example illustration of the collection of biomass as described above in reference to FIG. 5. In this example illustration, the combine 602 is shown removing the corn and placing the upper portions of the stalk and cobs on a conveyer 604. The conveyer 604 directs the stover materials directly to the baler 606 for generation of the bales 608. This process can result in minimal debris being collected with the biomass.

The operating conditions for subject conditions relating to some embodiments of the biomass collection system are shown in FIGS. 7A through 7D. Operating conditions for each subject condition can be indicated as "nested" ranges, comprising an acceptable operating range (the outer/wide range shown), a more specific exemplary operating range (the middle range shown, if applicable), and an even more specific exemplary operating range (the inner/narrow range shown, if applicable).

Figure 7A:
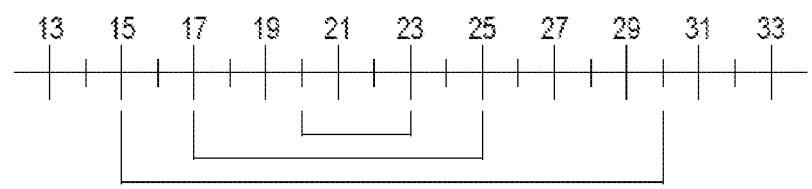
FIGS. 7A through 7D are diagrams of the operating conditions for the biomass collection process according to an exemplary embodiment.
Figure 7B:
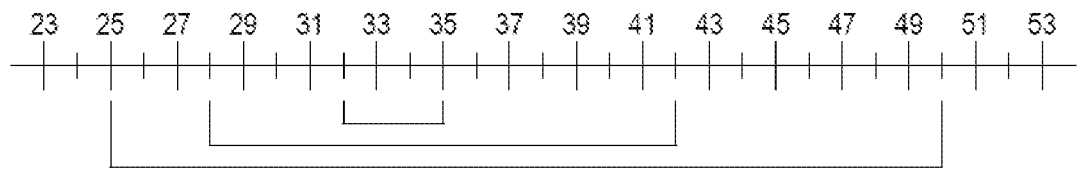
Figure 7C:
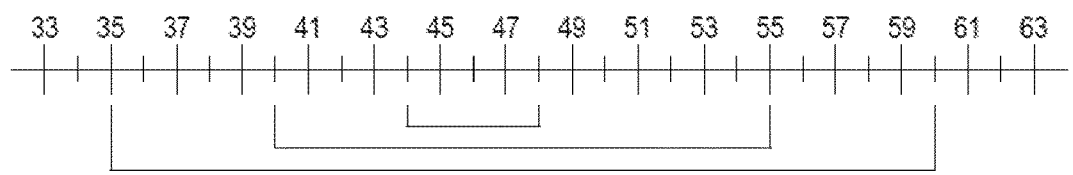
Figure 7D:
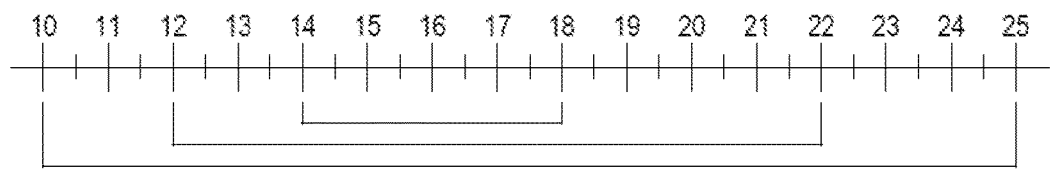

According to an embodiment, as shown in FIG. 7A, about 15 to 30 percent of the available biomass may be collected by second pass baling. According to an embodiment, about 17 to 25 percent of the available biomass may be collected, and according to another embodiment, about 20 to 23 percent of the available biomass may be collected by second pass baling. As shown in FIGS. 7B through 7D, according to an embodiment, the bales comprise about 25 to 50 percent cobs, 35 to 60 percent leaves and husks, 10 to 25 percent stalk, and less than 5 percent foreign material (e.g., material other than corn cobs, corn leaves and husks and corn stalks by weight). According to another embodiment, the bales comprise about 28 to 42 percent cobs, 40 to 55 percent leaves and husks, 12 to 22 percent stalk, and less than 4 percent foreign material. According to a particular embodiment, the bales comprise about 32 to 35 percent cobs, 44 to 48 percent leaves and husks, 14 to 18 percent stalk, and less than 3 percent foreign material.

Figure 8:
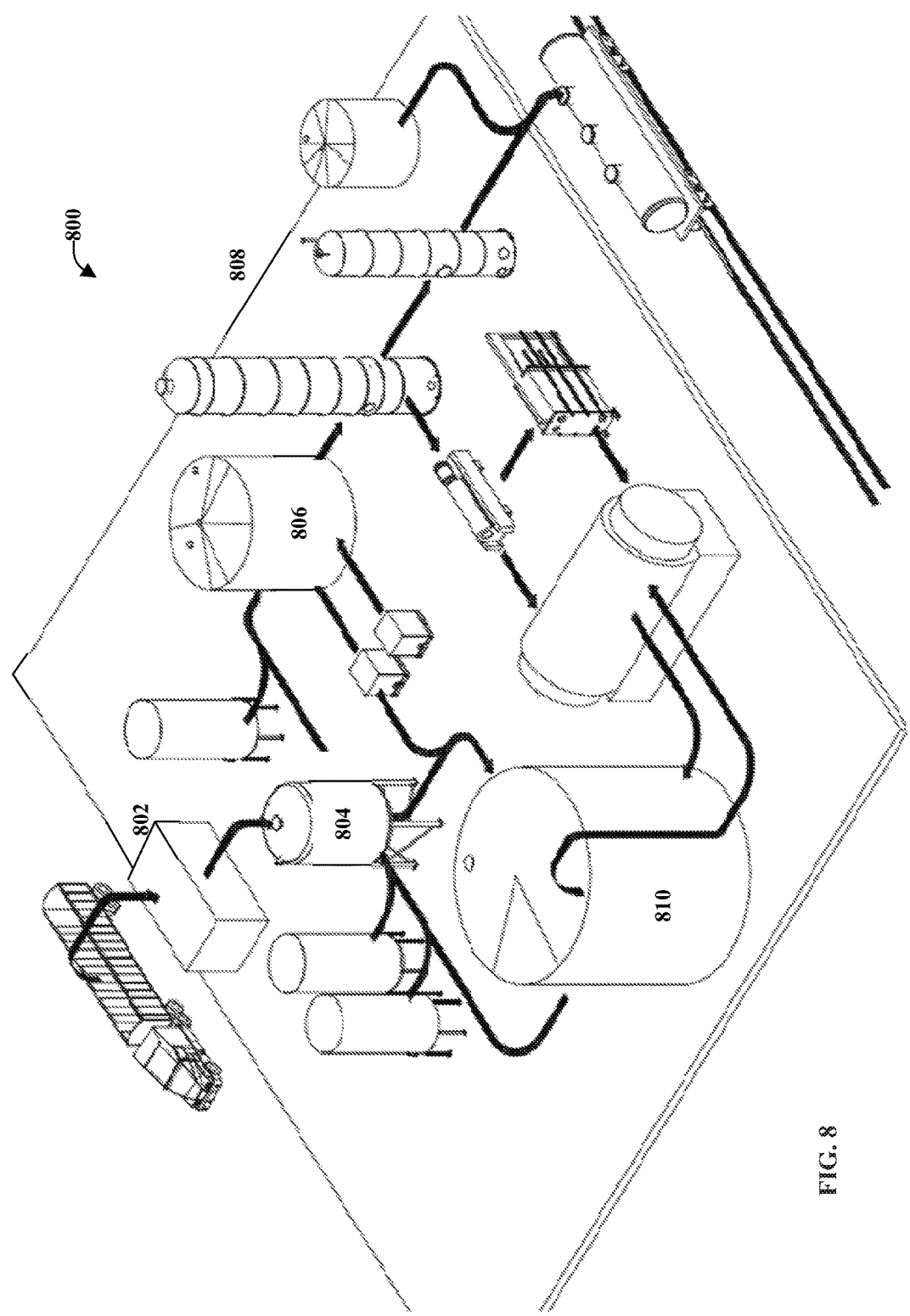
FIG. 8 is a perspective view of a biorefinery comprising a cellulosic ethanol production facility in accordance with some embodiments.

The following discussion will be directed to specific use cases of collected biomass, as described above, in relation to FIGS. 8-10. Referring to FIG. 8, a biorefinery 800 configured to produce ethanol from biomass is shown. Ethanol can be produced from grain-based feedstock (e.g. corn, sorghum/milo, barley, wheat, soybeans, etc.), from sugar (e.g. from sugar cane, sugar beets, etc.), and from biomass (e.g. from cellulosic feedstock such as switchgrass, corn cobs and stover, wood, algae, or other plant or microorganism material), as noted.

In a biorefinery configured to produce ethanol from biomass such as cellulosic feedstocks, ethanol is produced from lignocellulosic material (e.g., cellulose and/or hemicellulose). Lignocellulosic feedstock such as lignocellulosic material from the corn plant comprises cellulose (from which C6 sugars such as glucose can be made available) and/or hemicellulose (from which C5 sugars such as xylose and arabinose can be made available).

As shown in FIG. 8, the biorefinery 800 comprises an area where biomass is delivered and prepared to be supplied to the cellulosic ethanol production facility. The cellulosic ethanol production facility comprises apparatus for preparation 802, pre-treatment 804 and treatment of the biomass into treated biomass suitable for fermentation into fermentation product in a fermentation system 806. The facility comprises a distillation system 808 in which the fermentation product is distilled and dehydrated into ethanol. As shown in FIG. 8, the biorefinery may also comprise a waste treatment system 810 (shown as comprising an anaerobic digester and a generator).

Figure 9:
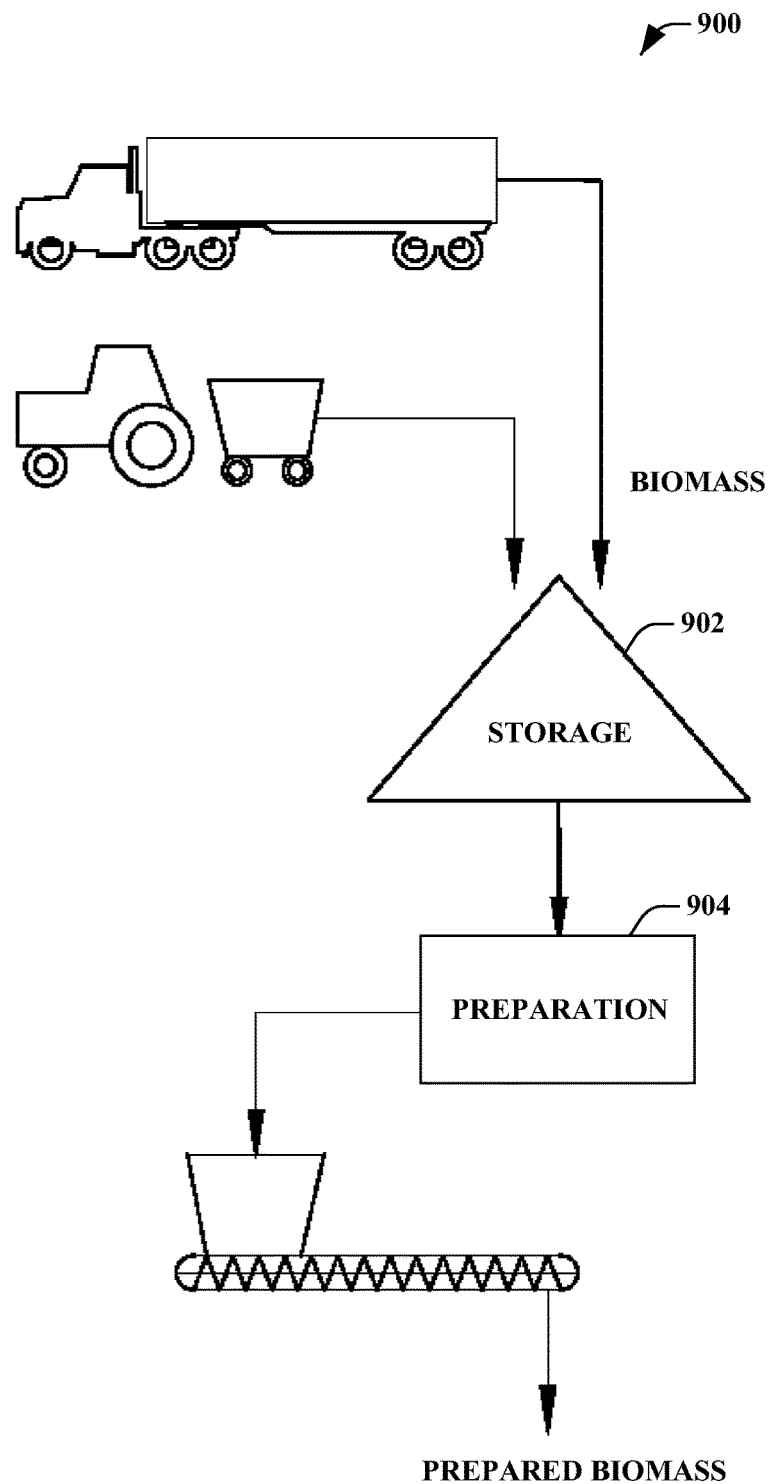
FIG. 9 is a schematic block diagram of a system for receipt and preparation of biomass for a cellulosic ethanol production facility, in accordance with some embodiments.

Referring to FIG. 9, a system 900 for preparation of biomass delivered to the biorefinery is shown. The biomass preparation system may comprise apparatus for receipt/unloading of the biomass, cleaning (e.g., removal of foreign matter), grinding (e.g., milling, reduction or densification), and transport and conveyance for processing at the plant. In some embodiments, the systems and methods disclosed herein for the collection of biomass may sufficiently reduce the amount of foreign material included with the biomass to render the cleaning step superfluous. Thus, with the disclosed collection of biomass, the cleaning step may be reduced or even omitted, in some embodiments. According to an exemplary embodiment, biomass in the form of corn cobs and stover may be delivered to the biorefinery and stored (e.g., in bales), shown as storage 902, and managed for use at the facility. According to an embodiment, the biomass may comprise at least 32 to 35 percent corn cobs (by weight) with corn stover and other matter. According to other exemplary embodiments, the preparation system 904 of the biorefinery may be configured to prepare any of a wide variety of types of biomass (e.g., plant material) for treatment and processing into ethanol and other bioproducts at the plant.

According to an embodiment, the biomass comprises plant material from the corn plant, such as corn cobs, husks, leaves and stalks (e.g., at least upper half or quarter of the stalk); the composition of the plant material (e.g., cellulose, hemicellulose and lignin) will be approximately as indicated in FIGS. 11A and 11B (e.g., after at least initial preparation of the biomass, including removal of any foreign matter). According to an embodiment, the plant material comprises corn cobs, husks/leaves and stalks; for example, the plant material may comprise (by weight) up to 100 percent cobs, up to 100 percent husks/leaves, approximately 50 percent cobs and approximately 50 percent husks/leaves, approximately 30 percent cobs and approximately 50 percent husks/leaves and approximately 20 percent stalks, or any of a wide variety of other combinations of cobs, husks/leaves and stalks from the corn plant. See FIG. 11A. According to an alternative embodiment, the lignocellulosic plant material may comprise fiber from the corn kernel (e.g., in some combination with other plant material). FIG. 11B provides typical and expected ranges believed to be representative of the composition of biomass comprising lignocellulosic material from the corn plant. According to exemplary embodiments, the lignocellulosic plant material of the biomass (from the corn plant) can comprise (by weight) cellulose at about 30 to 55 percent, hemicellulose at about 20 to 50 percent, and lignin at about 10 to 25 percent; according to a particular embodiment, the lignocellulosic plant material of the biomass (e.g., at least one of corn cobs, corn plant husks, corn plant leaves and corn plant stalks or stalk portions) can comprise (by weight) cellulose at about 35 to 45 percent, hemicellulose at about 24 to 42 percent, and lignin at about 12 to 20 percent. According to an embodiment, pre-treatment of the biomass can yield a liquid component that comprises (by weight) xylose at no less than 1.0 percent and a solids component that comprises (by weight) cellulose (from which glucose can be made available) at no less than 45 percent.

Figure 10:
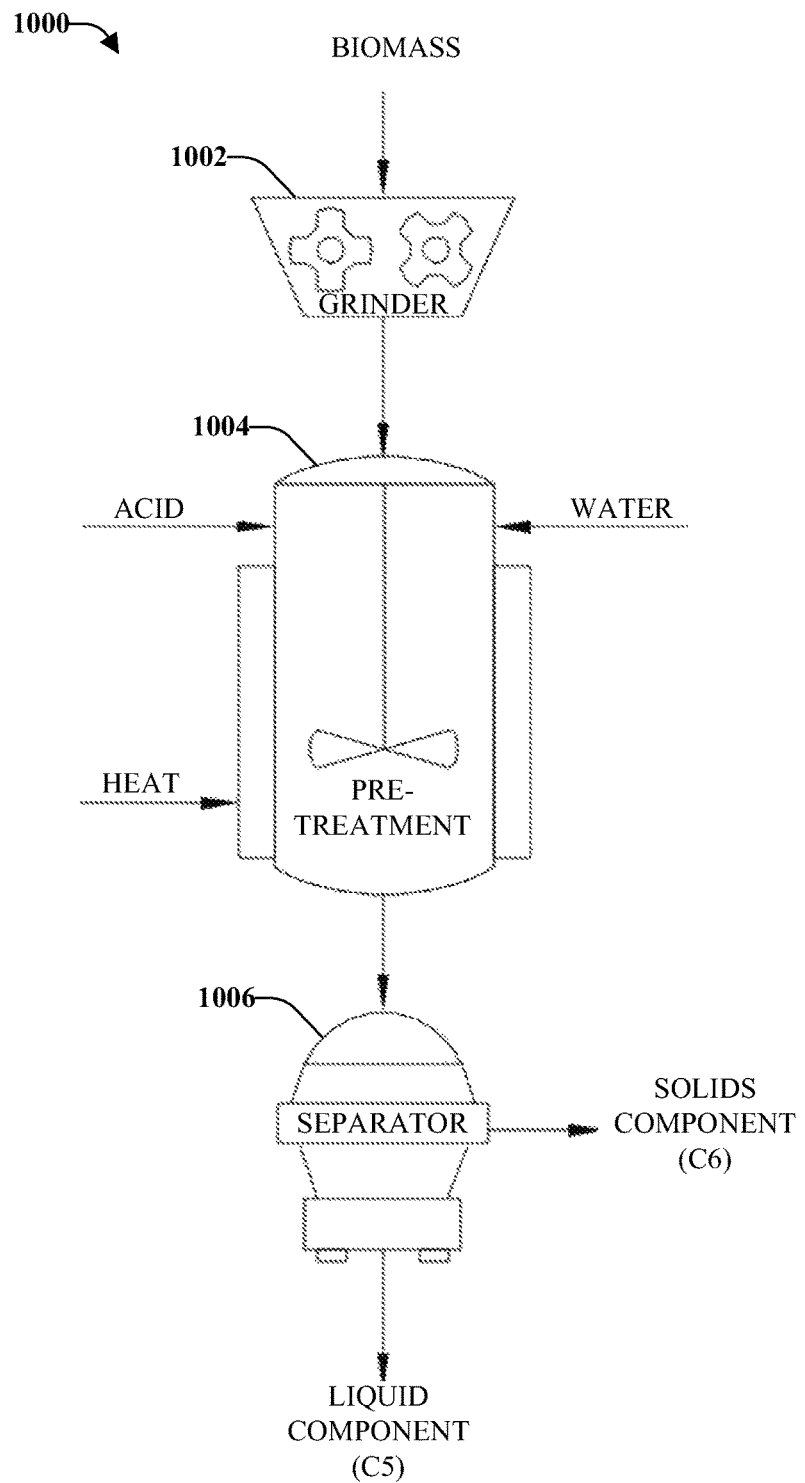
FIG. 10 is a schematic block diagram of apparatus used for preparation, pre-treatment, and separation of biomass, in accordance with some embodiments.

FIG. 10 shows an apparatus 1000 used for preparation, pre-treatment and separation of lignocellulosic biomass according to an exemplary embodiment. As shown, biomass is prepared in a grinder 1002 (e.g. a grinder or other suitable apparatus or mill). Pre-treatment 1004 of the prepared biomass is performed in a reaction vessel (or set of reaction vessels) supplied with prepared biomass and acid/water in a predetermined concentration (or pH) and other operating conditions. The pre-treated biomass can be separated in a centrifuge 1006 into a liquid component (C5 stream comprising primarily liquids with some solids) and a solids component (C6 stream comprising liquids and solids such as lignin and cellulose from which glucose can be made available by further treatment).

Figure 5:
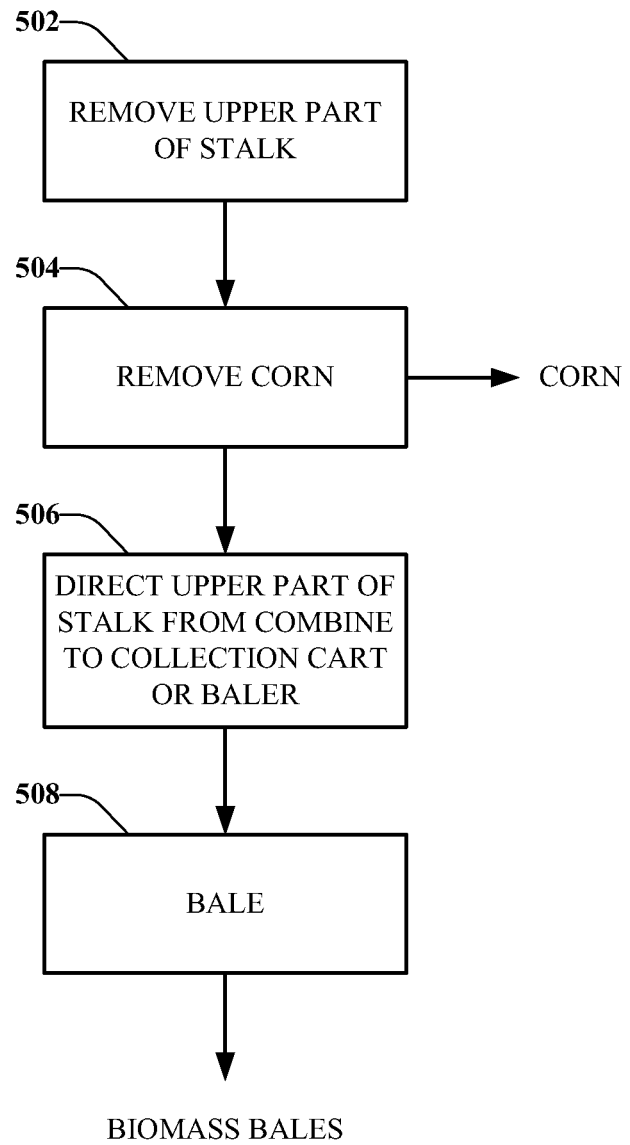
FIG. 5 is a schematic diagram of a second process flow for biomass collection, in accordance with some embodiments.

Limited examples were conducted using the system as shown in FIGS. 3 and 5 to test composition of bales using the system for collecting biomass disclosed herein.

EXAMPLE 1

The biomass harvest method was used in Example 1 to determine the composition of biomass bales using a typical rake and bale method (producing a traditional stover bale) and an embodiment of one or more of the disclosed aspects (producing a "second pass bale"). Corn was harvested using a John Deere 9770 combine (available from John Deere, Moline, Ill.). Sample 1 was created by raking the remaining stover on the field into windrows and baling the windrows into round bales. Samples 2 through 5 were created by using a stalk stomper apparatus (e.g. 80121 Stalk Stomper available from May Wes, Hutchinson, Minn.) to flatten the corn stalks and create a bed of material, depositing the residual stover into windrows on top of the bed, and baling the windrows into round bales. A John Deere 568 baler (available from John Deere, Moline, Ill.) was used for baling the biomass. The bales were tested for composition (percentage of stalk, leaf, husk, cob and foreign material). Results from Example 1 are shown in FIG. 12A. It was observed that a more desirable composition of biomass bales for ethanol production could be achieved by using the disclosed methods than could be achieved by using the typical rake and bale method. It was also observed that the second pass bales comprised a higher percentage of cob than traditional stover bales (an average of 34 percent as compared to 9 percent), a lower percentage of stalk (an average of 16 percent as compared to 32 percent), a lower percentage of grain (an average of 1 percent as compared to 6 percent), and a lower percentage of foreign material (an average of 2 percent as compared to 5 percent).

EXAMPLE 2

The biomass harvest method was used in Example 2 to determine the composition of biomass bales using a typical rake and bale method (producing a traditional stover bale) and an embodiment of the disclosed aspects (producing a "first pass bale"). Corn was harvested using a John Deere 9770 combine, (available from John Deere, Moline, Ill.). A first sample was created by raking the remaining stover on the field into windrows and baling the windrows into round bales. Other samples, which were averaged, were created by using a conveyer belt to transport the corn stover directly from the combine to the baler. A John Deere 568 baler (available from John Deere, Moline, Ill.) was used for baling the biomass. The bales were tested for composition (percentage of stalk, leaf, husk, cob and foreign material). Results from Example 2 are shown in FIG. 12B. It was observed that a more desirable composition of biomass bales for ethanol production could be achieved by using the disclosed methods than could be achieved by using the typical rake and bale method. It was also observed that the first pass bales comprised a higher percentage of cob than traditional stover bales (an average of 61 percent as compared to 9 percent), a lower percentage of stalk (an average of 6 percent as compared to 32 percent), a lower percentage of grain (an average of 2 percent as compared to 6 percent), and an equal percentage of foreign material (at 5 percent). However, depending upon conditions, much lower foreign materials were possible in the first pass baling (at 1 percent)

suggesting that through routine optimization it would be possible to greatly mitigate inclusion of foreign materials.

The embodiments as disclosed and described herein (including the FIGS. and Examples) are intended to be illustrative and explanatory of the various aspects. Modifications and variations of the disclosed embodiments, for example, of the apparatus and processes employed (or to be employed) as well as of the compositions and treatments used (or to be used), are possible; all such modifications and variations are intended to be within the scope of the subject disclosure.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

What is claimed is:

1. A method for collecting biomass, comprising:
   harvesting biomass with a combine in a first pass, wherein a first portion of the biomass is separated from a second upper portion of the biomass;
   flattening the first portion on top of a ground and into a bed formation, and depositing the second upper portion of the biomass in a windrow overlying the flattened first portion;
   baling the deposited second upper portion of the biomass in a second pass baling, wherein a bail of the second upper portion comprises no more than 4 percent by weight of materials foreign to the biomass;
   preparing and pre-treating the bales to form a pre-treated material;
   treating and fermenting the pre-treated material to produce a fermentation product comprising ethanol; and
   distilling the fermentation product to recover the ethanol;
   the second pass baling comprising collecting about 15 to 30 percent of the biomass.

2. The method of claim 1, wherein the second pass baling comprises collecting about 17 to 25 percent of the biomass.

3. The method of claim 1, wherein the second pass baling comprises collecting about 20 to 23 percent of the biomass.

4. The method of claim 1, further comprising flattening the first portion of the biomass by cutting the first portion of the biomass with a chopping corn head.

5. The method of claim 1, further comprising flattening the first portion of the biomass by stomping the first portion of the biomass with a stalk stomper.

6. The method of claim 1, wherein the harvesting comprises harvesting biomass that comprises lignocellulosic material.

7. The method of claim 6, wherein the harvesting comprises harvesting biomass that comprises at least one of corn cobs, corn plant husks, corn plant leaves, and corn plant stalks.

8. The method of claim 6, wherein the harvesting comprises harvesting biomass that consists essentially of corn cobs, corn plant husks, corn plant leaves, and corn stalks.

9. The method of claim 8, wherein the forming comprises forming bales that comprise about 25 to 50 percent of corn cobs by weight.

10. The method of claim 8, wherein the forming comprises forming bales that comprise about 28 to 42 percent of corn cobs by weight.

11. The method of claim 8, wherein the forming comprises forming bales that comprise about 32 to 35 percent of corn cobs by weight.

12. The method of claim 8, wherein the forming comprises forming bales that comprise about 35 to 60 percent of corn leaves and husks by weight.

13. The method of claim 8, wherein the forming comprises forming bales that comprise about 40 to 55 percent of corn leaves and husks by weight.

14. The method of claim 8, wherein the forming comprises forming bales that comprise about 43 to 48 percent of corn leaves and husks by weight.

15. The method of claim 8, wherein the forming comprises forming bales that comprise about 10 to 25 percent of corn stalks by weight.

16. The method of claim 8, wherein the forming comprises forming bales that comprise about 12 to 22 percent of corn stalks by weight.

17. The method of claim 8, wherein the forming comprises forming bales that comprise about 14 to 18 percent of corn stalks by weight.

18. The method of claim 8, wherein the forming comprises forming bales that comprise less than about 4 percent of material other than corn cobs, corn leaves and husks and corn stalks by weight.

19. The method of claim 8, wherein the forming comprises forming bales that comprise less than about 3 percent of material other than corn cobs, corn leaves and husks and corn stalks by weight.

* * * * *